(12) United States Patent
Charters et al.

(10) Patent No.: US 8,529,993 B2
(45) Date of Patent: Sep. 10, 2013

(54) LOW VOLATILITY POLYMERS FOR TWO-STAGE DEPOSITION PROCESSES

(75) Inventors: Robert Bruce Charters, Palmerston (AU); Dax Kukulj, Acton (AU)

(73) Assignee: Zetta Research and Development LLC—RPO Series, Wilmington, DE (US)

( * ) Notice: Subject to any disclaimer, the term of this patent is extended or adjusted under 35 U.S.C. 154(b) by 797 days.

(21) Appl. No.: 11/742,224

(22) Filed: Apr. 30, 2007

(65) Prior Publication Data

US 2008/0014367 A1    Jan. 17, 2008

Related U.S. Application Data

(60) Provisional application No. 60/796,667, filed on May 1, 2006.

(51) Int. Cl.
*B05D 3/12* (2006.01)
*B05D 3/06* (2006.01)

(52) U.S. Cl.
USPC ........ 427/240; 427/163.2; 427/487; 427/510; 118/52

(58) Field of Classification Search
USPC ................. 427/240, 487, 510, 163.2; 118/52
See application file for complete search history.

(56) References Cited

U.S. PATENT DOCUMENTS

| | | |
|---|---|---|
| 3,935,133 A | 1/1976 | Van Leuwen et al. |
| 4,609,252 A | 9/1986 | Wong et al. |
| 4,749,245 A | 6/1988 | Kawatsuki et al. |
| 4,824,522 A | 4/1989 | Baker et al. |
| 5,062,680 A | 11/1991 | Imamura et al. |
| 5,230,990 A | 7/1993 | Iwasaki et al. |
| 5,265,184 A | 11/1993 | Lebby et al. |
| 5,497,445 A | 3/1996 | Imoto |
| 5,534,101 A | 7/1996 | Keyworth et al. |
| 5,723,176 A | 3/1998 | Keyworth et al. |
| 5,914,709 A | 6/1999 | Graham et al. |
| 5,985,084 A | 11/1999 | Summersgill et al. |
| 6,037,105 A | 3/2000 | You et al. |
| 6,054,253 A | 4/2000 | Fardad et al. |
| 6,088,492 A | 7/2000 | Kaneko et al. |
| 6,114,090 A | 9/2000 | Wu et al. |
| 6,181,842 B1 | 1/2001 | Francis et al. |
| 6,191,053 B1 | 2/2001 | Chun et al. |

(Continued)

FOREIGN PATENT DOCUMENTS

| | | |
|---|---|---|
| JP | 08-064521 A | 8/1996 |
| JP | 11-162808 A | 6/1999 |

(Continued)

OTHER PUBLICATIONS

Email correspondence from Mr. Louay Eldada, author of "Advances in Polymer Integrated Optics" (IEEE Journal of Selected Topics in Quantum Electronics), dated Mar. 8, 2011.*

(Continued)

*Primary Examiner* — Kirsten Jolley
(74) *Attorney, Agent, or Firm* — Mattingly & Malur, PC (57) ABSTRACT

This invention relates to materials and processes for the preparation of high quality layers, for example for the fabrication of optical devices such as waveguides. In particular, the invention relates to the use of low volatility polymer materials for the deposition of high quality layers on large area substrates via a two-stage process, for example extrude-and-spin.

29 Claims, 2 Drawing Sheets

(56) References Cited

U.S. PATENT DOCUMENTS

| | | |
|---|---|---|
| 6,238,735 B1 | 5/2001 | Mandal et al. |
| 6,291,704 B1 | 9/2001 | Anderson et al. |
| 6,308,001 B1 | 10/2001 | Nair et al. |
| 6,316,589 B1 | 11/2001 | You et al. |
| 6,319,316 B1 | 11/2001 | Gibson et al. |
| 6,327,415 B1 | 12/2001 | Koyano et al. |
| 6,335,149 B1 | 1/2002 | Xu et al. |
| 6,341,190 B1 | 1/2002 | Summersgill et al. |
| 6,351,260 B1 | 2/2002 | Graham et al. |
| 6,495,205 B1 | 12/2002 | Gibson et al. |
| 6,496,637 B2 | 12/2002 | Blomquist et al. |
| 6,540,833 B1 | 4/2003 | Gibson et al. |
| 6,548,115 B1 | 4/2003 | Gibson et al. |
| 6,555,288 B1 | 4/2003 | Xu et al. |
| 6,603,917 B2 | 8/2003 | Takayama et al. |
| 6,685,921 B2 | 2/2004 | Lawlor |
| 6,727,337 B2 | 4/2004 | Friedrich |
| 6,800,724 B2 | 10/2004 | Zha et al. |
| 6,818,721 B2 | 11/2004 | Zha et al. |
| 6,917,749 B2 | 7/2005 | Gao et al. |
| 6,965,006 B2 | 11/2005 | Zha |
| 7,030,039 B2 | 4/2006 | Gurer et al. |
| 2001/0031269 A1 | 10/2001 | Arnaud |
| 2004/0209784 A1 | 10/2004 | Hardman et al. |
| 2005/0214479 A1 | 9/2005 | Erben |

FOREIGN PATENT DOCUMENTS

| | | |
|---|---|---|
| WO | WO 96/17370 | 6/1996 |
| WO | WO 96/17371 | 6/1996 |
| WO | WO 99/08158 | 2/1999 |
| WO | WO 01/94103 | 12/2001 |

OTHER PUBLICATIONS

L. Eldada and L W Shacklette, "Advances in Polymer Integrated Optics", *IEE Journal of Selected Topics in Quantum Electronics*, vol. 6, pp. 54-68, 2000.

International Preliminary Report on Patentability issued in counterpart PCT Application No. PCT/AU2007/000570, report dated Jul. 4, 2008.

Written Opinion of the International Preliminary Examining Authority issued in counterpart PCT Application No. PCT/AU2007/000570, report dated Apr. 18, 2008.

\* cited by examiner

LOW VOLATILITY POLYMERS FOR TWO-STAGE DEPOSITION PROCESSES

CROSS-REFERENCE TO RELATED APPLICATION

This application is a non-provisional claiming priority under 35 USC §119(e) to U.S. provisional application Ser. No. 60/796,667 filed on May 1, 2006.

FIELD OF THE INVENTION

The invention relates to processes for the preparation of high quality thin layers, in particular for thin layers suitable for use as optical devices, such as waveguides The invention also relates to polymers for use in the method, and to coated substrates prepared by the method.

BACKGROUND

Several manufacturing processes require the deposition of high quality layers of polymer material onto a substrate. High quality polymeric layers are required for example in semiconductor chip manufacture, where photoresist layers are used in the photolithography process. Another example is the manufacture of flat panel displays, where polymer layers are required for a variety of purposes including arrays of organic light emitting diodes (OLEDs) Yet another example is the manufacture of integrated optical waveguides from polymer materials. The invention will be described with reference to the preparation of integrated optical waveguides, but it will be understood by those skilled in the art to be readily applicable to other manufacturing processes/technologies requiring high quality layers of polymer material.

The term polymer as used herein refers to a molecule of high relative molecular mass, the structure of which comprises portions having multiple repetitions of units derived actually or conceptually from molecules of low relative molecular mass.

The term pre-polymer as used herein refers to any molecule (monomer, oligomer or macromolecule) capable of entering, through reactive groups, into polymerisation or further polymerisation, thereby contributing more than one monomeric unit to the final polymer.

Polymer waveguides are commonly manufactured using a combination of UV, photolithography and etching, where a layer of polymer or pre-polymer (eg. monomers and/or oligomers) is deposited onto a substrate and subsequently etched in a "wet" or "dry" process to pattern waveguides. The etching process is "wet" in cases where the polymer or pre-polymer is hardened by exposure to UV light, so that a suitable solvent can dissolve the unexposed material. Examples of waveguide fabrication via "wet" etching can be found in U.S. Pat. Nos. 4,609,252, 6,037,105, 6,054,253, 6,327,415 and 6,335,149 "Dry" etching includes for example reactive ion etching or plasma etching, where the UV exposure patterns a layer of photoresist on top of the polymer or pre-polymer, rather than the polymer or pre-polymer itself. Examples of waveguide fabrication via "dry" etching are disclosed in U.S. Pat. Nos. 4,824,522, 5,062,680, 5,497,445, and 6,088,492.

Irrespective of the type of patterning and etching processes used, it is necessary to be able to deposit high quality ("optical quality") layers of the polymer or pre-polymer onto a substrate. If the polymer layer has a rough surface or is of uneven thickness, the resulting waveguides will have excessive scattering loss and may be non-uniform in shape. Several methods are available for depositing layers of polymer or pre-polymer, such as spin coating, dip coating, roller coating, extrusion coating, slot coating, screen printing, meniscus coating, spray coating, curtain coating and doctor blading. Of these, spin coating is widely recognised as the method of choice for depositing optical quality layers.

All of these deposition methods require the polymer or pre-polymer to be in liquid form. Virtually all photoresists and most optical polymers tend to be high molecular weight polymers that are solids or highly viscous liquids, and to facilitate deposition it is necessary to add a solvent to dissolve or dilute them.

In the spin coating process, a pool of material is dispensed onto the centre of the substrate, and the substrate is then spun at high speed (typically 1000 rpm or more) to spread the material into a smooth, thin layer on the substrate. In a common variation, the substrate is initially spun at low speed to spread the dispensed material, then the speed is increased to improve uniformity and produce a thin, highly uniform layer. For successful spin coating, it is vital that the rheology of the liquid be well controlled. It is preferable for the polymer/solvent mixtures used to have low volatility, to minimise changes in the rheology of the polymer solution during the coating process. In particular, any solvent present must have low volatility so that it does not evaporate too quickly during the coating process. Changes in solution rheology during coating can lead to poor quality layers. A "soft bake" step to remove residual solvent is usually necessary prior to any subsequent processing steps.

A known problem with spin coating, discussed for example in U.S. Pat. No. 6,191,053, is that it is extremely wasteful of material, with as much as 90-95% of the liquid dispensed onto the substrate being spun off, and only 5-10% remaining as the deposited layer. Although it is possible to collect and recycle this material, this is generally a difficult and time consuming procedure For applications where high purity is essential, material recycling may be impractical because of the contamination risk. This is especially important in the case of optical waveguide manufacture, where particulate impurities must be minimised to reduce scattering loss. The wastage also represents a major expense that is desirable to avoid.

During optical waveguide manufacture it is usual to produce as many waveguide structures as possible on a single substrate and then dice them out. Such an approach is similar to that used in the semiconductor industry to make electronic integrated circuits. Circular substrates (usually silicon) of varying sizes up to 300 mm in diameter are commonly used in the semiconductor industry and for optical waveguide manufacture. As described in our co-pending application "Methods for fabricating polymer waveguides on large area substrates", Ser. No. 11/742,194, filed on even date and incorporated herein by reference in its entirety, it is possible to use larger substrates, such as for example 400 mm×500 mm glass or polymer substrates, when manufacturing waveguide devices. Such large area rectangular panels are especially preferred for economy of scale, and also for improved packing efficiency (since many waveguide devices are roughly rectangular in plan view) The flat panel display industry has a range of standard substrates sizes, starting with Generation 1 (270 mm×300 mm) and currently extending to Generation 7 (1870 mm×2200 mm).

Figure 1:
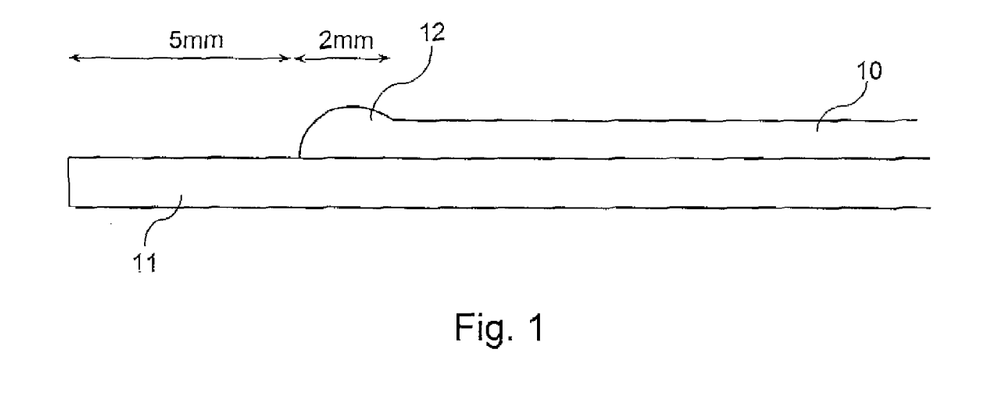
FIG. 1 shows a cross-sectional side view of a polymer layer deposited onto a substrate by extrusion coating, in the vicinity of the substrate edge.
Figure 2:
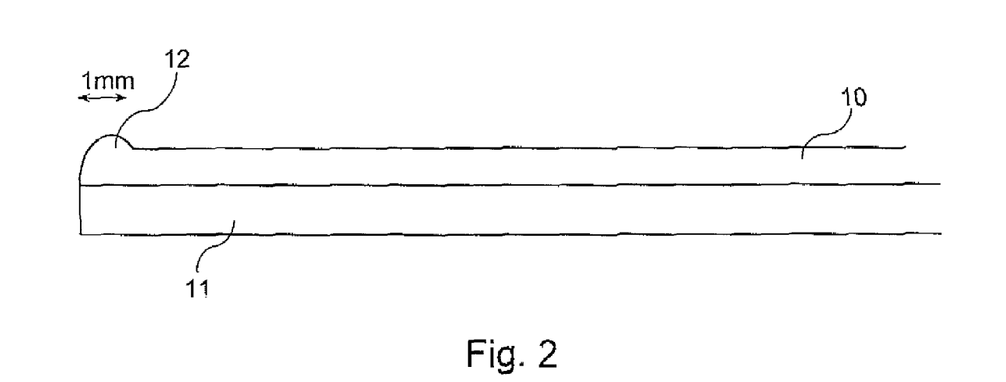
FIG. 2 shows a cross-sectional side view of a polymer layer deposited onto a substrate by spin coating, in the vicinity of the substrate edge.

However as mentioned above, spin coating is inherently wasteful of material, and when using large area substrates, an alternative deposition technique that is less wasteful of material and yet offers excellent quality layers is particularly desirable. Techniques such as extrusion coating, slot coating, roller coating, meniscus coating, spray coating, curtain coating and doctor blading all have significantly less material wastage than spin coating and can be readily applied to large area rectangular substrates. Extrusion coating in particular, where material is extruded through a nozzle or a slot onto a substrate, has been shown to yield good quality polymer layers, with some manufacturers claiming ±2% thickness uniformity (defined below), as disclosed for instance in U.S. Pat. Nos. 6,495,205 and 6,548,115 However, even this layer quality is not always sufficient for applications such as the manufacture of polymer optical waveguides, where thickness uniformity better than to 5% is generally required. In such situations, a two-stage deposition process may be applicable. Firstly, a low wastage method such as extrusion coating, slot coating, roller coating, meniscus coating, spray coating, curtain coating or doctor blading may be used to deposit a polymer layer as the first stage, and secondly the substrate is spun to further improve the uniformity of the polymer layer Hereinafter, the two-stage deposition process will be referred to as an "extrude-and-spin" process. However it should be understood that, for the purposes of this invention, a two-stage deposition process comprises any liquid layer deposition method as the first stage, followed by spinning as the second stage. That is, where extrusion coating is mentioned, it could equally be some other technique such as slot coating, roller coating, meniscus coating, spray coating, curtain coating or doctor blading Apart from producing layers with inferior thickness uniformity, a further disadvantage of many low wastage deposition methods, including extrusion coating, is that (compared to spin coating) they utilise a lesser portion of the available substrate area. Typically, an extrusion coater will only deposit material to within 5 mm of the substrate edge, and the edge bead on the deposited material may extend in a further 2 mm, as shown in FIG. 1. In contrast, in spin coating material is deposited light to the edge of a substrate, with an edge bead that may only extend 1 mm in from the edge, as shown in FIG. 2

For the purposes of this specification, thickness uniformity may be defined in a relative manner, as (standard deviation in thickness/average thickness)*100%. However, it will be appreciated that while this commonly used relationship is appropriate for optical layers of conventional thicknesses (up to about 110 µm), it is not entirely appropriate for use in those cases where the layer itself is particularly thick. In very thick layers, good relative thickness uniformity can be obtained even where the variation in surface profile (absolute thickness) is unacceptable.

For the purposes of this specification, thickness uniformity values and/or ranges quoted for layers deposited onto a substrate apply to the entire substrate area except for a 5 mm wide exclusion zone along the periphery of the substrate It will be appreciated by those skilled in the art that irregularities (frequently referred to as "edge beads") at the substrate edges are difficult to avoid with deposition from the liquid phase. Substrate edges are not usually assessed when considering layer thickness, as edge portions are either generally discarded after dicing (into smaller optical components) or do not form part of the functional region of an optical device.

Unlike in conventional spin coating where spinning can begin as soon as (or a predefined time after) the material is dispensed, with extrude-and-spin there can often be a considerable time lag between the first stage extrusion process and the second stage spinning process An additional time delay is incurred if the extrusion and spinning steps are carried out on different instruments so that the substrate has to be transferred between them Furthermore the extrusion stage takes a finite time, so the material deposited at the beginning of the extrusion stage is on the substrate for a longer time than the material deposited at the end Because of this delay between extrusion and spinning, it is very difficult to accurately and reliably control the layer quality when a solvent-containing polymer material is used in the process, a problem exacerbated in the case of coating large substrates. Not only does the long delay result in evaporation of solvent and any other volatile components, but the variable nature of the delay causes changes in the fluid rheology, and therefore inconsistencies in the final layer properties. Since virtually all photoresists and most optical polymers need to be diluted with or dissolved in a solvent prior to deposition, this is a significant problem for the extrude-and-spin deposition process To prevent such problems, practitioners using conventional solvent-based materials for extrude-and-spin deposition, or for spin coating in general, often must resort to elaborate means such as controlled atmosphere housings with careful control of solvent vapour concentration (U.S. Pat. Nos. 6,238,735; 7,030,039)

It is an object of the present invention to overcome or ameliorate at least one of the disadvantages of the prior art, or to provide a useful alternative.

SUMMARY OF THE INVENTION

In a broad aspect, the invention provides the use of substantially non-volatile polymers and/or pre-polymers for the deposition and fabrication of polymer optical waveguides incorporating an "apply and spin", or more particularly an "extrude-and-spin" deposition process. The term "substantially non-volatile" as used herein in relation to a two stage deposition process means that the polymer and/or pre-polymer has inherent physical properties that keep it in liquid or flowable form throughout the process, up until curing. In particular; the polymer and/or pre-polymer does not contain any added component which is volatile under the temperature, pressure and other processing conditions employed. For example, the polymer and/or pre-polymer is not converted to liquid form, nor is its viscosity adjusted, by the addition of a conventional liquefying agent such as a solvent that does not become incorporated into or remain in the final polymer waveguide material. Further, the polymer and/or pre-polymer does not contain any polymerisable, copolymerisable and/or curable component such as a low molecular weight monomer that is volatile under the temperature, pressure and other processing conditions employed To elaborate, by way of example, the addition of cyclohexanone to a curable polymeric system to reduce viscosity and hence assist processing, would not result in a substantially non-volatile system.

Volatility can be determined by many parameters, but for the purpose of this invention, one indication of a substantially nonvolatile material is that it is free from any components boiling at less than 175° C. at 760 mmHg, preferably free from any components boiling at less than 225° C. at 760 mmHg, and most preferably free from any components boiling at less than 275° C. at 760 mmHg Another indication of a non-volatile material is that it has a vapour pressure of less than 0 5 mmHg at 20° C., preferably less than 0 1 mmHg at 20° C., and most preferably less than 0 01 mmHg at 20° C.

Yet another indication of a non-volatile material is that its vapour pressure exceeds 1 mmHg only when the temperature exceeds 25° C., preferably when the temperature exceeds 50° C., and most preferably when the temperature exceeds 75° C.

According to a first aspect, the invention provides a method of coating a substrate with a layer of coating material of substantially uniform thickness, said method comprising:

applying a liquid film of a substantially non-volatile coating material to said substrate, and spinning said substrate to provide a layer of substantially uniform thickness Preferably, applying a liquid film of a substantially non-volatile coating material to the substrate is by a process selected from extrusion coating, slot coating, roller coating, meniscus coating, spray coating, curtain coating and doctor blading. Most preferably, the coating material is applied to the substrate by extrusion coating Preferably, the substantially non-volatile coating material is solvent-free.

For preference, the layers of the present invention are substantially uniform in thickness. Thickness uniformity is preferably better than 4%, more preferably better than 2%, and most preferably better than 0 5%. Alternatively, absolute variations in thickness for optical layers are preferably less than 2 µm, more preferably less than 0 5 µm, and even more preferably less than 0.25 µm Preferably, the coating material is a polymer, pre-polymer, or mixture of oligomers and monomers. More preferably, the coating material contains epoxy groups or ethylenically unsaturated groups such as acrylate, methacrylate or vinyl groups capable of undergoing addition polymerisation, so that the coating material is curable by actinic radiation, for example, UV radiation. Apart from UV light, several types of actinic radiation suitable for curing photo-curable polymers are known in the art, including X-rays, visible light and electron beams and are suitable for the present invention. Alternatively, another suitable curing stimulus such as heat may be applied. Preferably, the coating material is a siloxane polymer or pre-polymer. Alternatively, the coating material may be a hydrocarbon polymer or pre-polymer.

The coating material preferably has a viscosity in the range 100-10,000 cP, more preferably in the range 500-5,000 cP and even more preferably in the range 1,000-4,000 cP.

Preferably, the article being manufactured is an optical waveguide, ie. the substrate is coated with a layer of coating material of substantially uniform thickness for the purpose of fabricating an optical waveguide. The optical waveguide may, for example, form a component of an optical backplane, a telecommunications system, a data communications system, or a waveguide-based optical touch screen sensor.

In one preferred embodiment, the substrate is a circular wafers most preferably a circular wafer of up to 300 mm in diameter The circular wafer may be composed of silicon, oxidised silicon, gallium arsenide, indium phosphide, sapphire, a ceramic, a glass or a polymer.

In an alternative preferred embodiment, the substrate is a rectangular panel. For preference, the rectangular panel is at least 200 mm×200 mm, and preferably at least 270 mm×300 mm in size and is composed of glass or a polymer, for example a polycarbonate, a polysulfone, a polyimide or a polyester such as polyethylene terephthalate (PET). Alternatively, the substrate may be a printed circuit board such as FR-4.

According to a second aspect, the invention provides a method of coating a substrate with a cured layer of coating material of substantially uniform thickness, said method comprising:

applying a liquid film of substantially non-volatile coating material to said substrate; spinning said substrate to provide a layer of substantially uniform thickness; and curing said coating material to provide a cured layer of substantially uniform thickness.

Preferably the coating material is applied to said substrate by a process selected from extrusion coating, slot coating, roller coating, meniscus coating, spray coating, curtain coating and doctor blading. Most preferably, the coating material is applied to the substrate by extrusion coating Preferably, the substantially non-volatile coating material is solvent-free.

Thickness uniformity is preferably better than 4%, more preferably better than 2%, and most preferably better than 0.5%. Absolute variation in thickness is preferably less than 2 µm, more preferably less than 0.5 µm, and even more preferably less than 0 25 µm.

Preferably, curing occurs for a predetermined portion of the coating material, providing a defined region of coating material that is uncured and a defined region of cured material. It is desirable if curing causes the coating material to have a solubility different from the solubility of the uncured coating material. In particular, it is highly desirable that curing causes the coating material to be less soluble in a developing solvent than the coating material that is uncured. Alternatively, the coating material may be cured in its entirety, in a process commonly known as "blanket curing" or "flood exposure".

Preferably, the method further comprises the step of removing coating material that is uncured, most preferably by exposure to a developing solvent.

Preferably, the coating material is a polymer, pre-polymer, or mixture of oligomers and monomers. More preferably, the coating material contains epoxy groups or ethylenically unsaturated groups such as acrylate, methacrylate or vinyl groups capable of undergoing addition polymerisation, so that the coating material is curable by actinic radiation, for example, UV radiation. Alternatively, another suitable curing stimulus such as heat may be applied. Preferably, the coating material is a siloxane polymer or pre-polymer. Alternatively, the coating material may be a hydrocarbon polymer or pre-polymer The coating material preferably has a viscosity in the range 100-10,000 cP, more preferably in the range 500-5,000 cP and even more preferably in the range 1,000-4,000 cP.

Preferably, the article being manufactured is an optical waveguide, ie. the substrate is coated with a layer of coating material of substantially uniform thickness for the purpose of fabricating an optical waveguide. The optical waveguide may, for example, form a component of an optical backplane, a telecommunications system, a data communications system, or a waveguide-based optical touch screen sensor In one preferred embodiment, the substrate is a circular wafer, most preferably a circular wafer of up to 300 mm in diameter The circular wafer may be composed of silicon, oxidised silicon, gallium arsenide, indium phosphide, sapphire, a ceramic, a glass or a polymer.

In an alternative preferred embodiment, the substrate is a rectangular panel. For preference, the rectangular panel is at least 200 mm×200 mm and preferably at least 270 mm×300 mm in size and is composed of glass or a polymer, for example a polycarbonate, a polysulfone, a polyimide or a polyester such as polyethylene terephthalate (PET) Alternatively, the substrate may be a printed circuit board such as FR-4.

According to a third aspect the invention provides an optical device comprising a substrate and at least one optical waveguide formed on said substrate, the optical waveguide prepared by applying a liquid film of a substantially non-volatile coating material to said substrate, spinning said substrate to provide a layer of substantially uniform thickness; curing a predetermined portion of said coating material to achieve a cured layer of substantially uniform thickness and predetermined configuration; and removing uncured coating material.

Preferably the coating material is applied to said substrate by a process selected from extrusion coating, slot coating, roller coating, meniscus coating, spray coating, curtain coating and doctor blading Most preferably, the coating material is applied to the substrate by extrusion coating.

Preferably, the substantially non-volatile coating material is solvent-free.

Preferably, the coating material is a polymer; pre-polymer, or mixture of oligomers and monomers. More preferably, the coating material contains epoxy groups or ethylenically unsaturated groups such as acrylate, methacrylate or vinyl groups capable of undergoing addition polymerisation, so that the coating material is curable by actinic radiation, for example, UV radiation. Alternatively, another suitable curing stimulus such as heat may be applied Preferably, the coating material is a siloxane polymer or pre-polymer. Alternatively, the coating material may be a hydrocarbon polymer or pre-polymer.

Thickness uniformity is preferably better than 4%, more preferably better than 2%, and most preferably better than 0.5%. Absolute variation in thickness is preferably less than 2 μm, more preferably less than 0.5 μm, and even more preferably less than 0.25 μm.

The coating material preferably has a viscosity in the range 100-10,000 cP, more preferably in the range 500-5,000 cP and even more preferably in the range 1,000-4,000 cP.

Preferably, the uncured coating material is removed by exposure to a developing solvent.

Preferably the optical device forms a component of an optical backplane, a telecommunications system, a data communications system, or a waveguide-based optical touch screen sensor.

In one preferred embodiment, the substrate is a circular wafer, most preferably a circular wafer of up to 300 mm in diameter The circular wafer may be composed of silicon, oxidised silicon, gallium arsenide, indium phosphide, sapphire, a ceramic, a glass or a polymer.

In an alternative preferred embodiment, the substrate is a rectangular panel. For preference, the rectangular panel is at least 200 mm×200 mm and preferably at least 270 mm×300 mm in size and is composed of glass or a polymer, for example a polycarbonate, a polysulfone, a polyimide or a polyester such as polyethylene terephthalate (PET). Alternatively, the substrate may be a printed circuit board such as FR-4.

DESCRIPTION OF FIGURES

The invention will now be described, by way of example only, with reference to the accompanying drawings in which.

DETAILED DESCRIPTION OF THE INVENTION

Most early polymer waveguide materials known in the art required a solvent for processing. These include polycarbonate, polymethyl methacrylate and poly(α-methylstyrene) (U.S. Pat. No. 4,749,245), polydiacetylenes (U.S. Pat. No. 4,824,522), and deuterated or halogenated polyacrylates and polysiloxanes (U.S. Pat. No. 5,062,680) More recent polymer waveguide materials such as fluorinated polyimides (U.S. Pat. No. 6,316,589), deuterated poly(methyl methacrylimide) (U.S. Pat. No. 6,327,415) and highly fluorinated polymers such as TEFLON® AF, CYTOP® and HYFLON® (U.S. Pat. No. 6,603,917) also require a solvent for processing Liquid polymers and/or pre-polymers do not require the addition of a solvent to facilitate processing. Liquid polymers and/or pre-polymers typically comprise low molecular weight monomer and/or oligomer structures Provided the monomers and/or oligomers are sufficiently non-volatile and the liquid has a suitable viscosity, the problem of evaporation of volatile components is obviated and a soft-baking step is not required. U.S. Pat. Nos. 6,308,001, 6,291,704, 6,496,637, 6,555,288 and 6,114,090 disclose the use of solvent-free polymers for manufacturing optical waveguides, and the advantages thereof for the spin coating of optical quality layers are known (L Eldada and L. W Shacklette, "Advances in polymer integrated optics", *IEEE Journal of Selected Topics in Quantum Electronics* vol. 6, pp 54-68, 2000). Solvent-free polymers have been used to manufacture optical waveguides using a reel-to-reel moulding process (U.S. Pat. Nos. 5,985,084 and 6,341,190) and an extrusion/UV cute process (U.S. Pat. Nos. 5,534,101 and 5,723,176) However, to our knowledge, the use of solvent-free polymers, or more generally substantially non-volatile polymers, for an extrude-and-spin or any other two-stage deposition process has not been disclosed. Notably, FAStar Ltd, who manufacture state-of-the-art extrusion coating equipment, and who also mention the possible addition of a spinning step, make no mention of solvent-free polymers; all of their patents (including U.S. Pat. Nos. 6,495,205, 6,548,115, 6,319,316 and 6,540,833) disclose that the material being deposited is solvent-based. Solvent-free polymers for liquid phase deposition are unusual There are several criteria by which a liquid material may be regarded as being "substantially non-volatile" Some criteria may involve the concepts of boiling point (at a specified pressure) or vapour pressure (at a specified temperature). Another criterion may concern the amount of weight of material lost per unit surface area in a specified period of time at a specified temperature and pressure. For the purposes of this invention, the volatility of a liquid material will be defined according to three criteria: boiling point at 760 mmHg pressure (ie 1 atm); vapour pressure at 20° C.; and the temperature at which the vapour pressure exceeds 1 mmHg Note that boiling point and vapour pressure are related—at a given pressure (say 760 mmHg), a liquid will boil when its vapour pressure reaches that pressure. Generally, boiling point is the simplest criterion for comparing the volatility of different liquids, because it is readily observable unless the liquid decomposes before boiling The boiling point of a liquid will usually be listed amongst its physical properties. Comparisons on the basis of vapour pressure can be more difficult because vapour pressure data may not always be readily available, and is not always quoted at the same temperature.

A variety of solvents have been used to dissolve polymer materials for spin coating, including chloroform, benzene and toluene (U.S. Pat. No. 4,749,245), dimethyl cyclohexane (U.S. Pat. No. 4,824,522), methyl isobutyl ketone (MIBK, U.S. Pat. No. 5,062,680), N,N-dimethyl acetamide (DMA, U.S. Pat. No. 6,316,589), 2-methoxy ethyl acetate (U.S. Pat. No. 6,603,917) and ethyl lactate (U.S. Pat. No. 7,030,039). In recent years, cyclopentanone, cyclohexanone and propylene glycol monomethyl ether acetate (PGMEA) have become popular spin coating solvents. Selected boiling point and vapour pressure data for these solvents are presented in Table 1, where available.

TABLE 1

| Solvent | Boiling point at 1 atm pressure (° C.) | Vapour pressure at 20° C. (mmHg) | Temperature at which vapour pressure is 1 mmHg (° C.) |
| --- | --- | --- | --- |
| Chloroform | 61.3 | 159 | −58.0 |
| Benzene | 80.1 | 74.6 | −36.7 |
| Toluene | 110.6 | 22 | −26.7 |
| MIBK | 119 | 15 | −1.4 |
| Dimethyl cyclohexane | 124 | not available | not available |
| Cyclopentanone | 130-131 | 11.4 (at 25° C.) | not available |
| 2-methoxy ethyl acetate | 145 | not available | not available |
| PGMEA | 145-146 | 3.7 | not available |
| Ethyl lactate | 154 | 2 | not available |
| Cyclohexanone | 155 | 2 | 1.4 |
| DMA | 164.5-166 | not available | not available |

Since all of these solvents have a boiling point below 175° C., one possible criterion for a liquid material to be "substantially non-volatile" is that it be free from any components boiling at less than 175° C. at 760 mmHg, preferably free from any components boiling at less than 225° C. at 760 mmHg, and most preferably flee from any components boiling at less than 275° C. at 760 mmHg. Alternatively, a substantially non-volatile liquid material may be defined as one that has a vapour pressure of less than 0.5 mmHg at 20° C., preferably less than 0.1 mmHg at 20° C., and most preferably less than 0.01 mmHg at 20° C. Alternatively, a substantially non-volatile liquid material may be defined as one whose vapour pressure exceeds 1 mmHg only when the temperature exceeds 25° C., preferably when the temperature exceeds 50° C., and most preferably when the temperature exceeds 75° C.

Using large area rectangular substrates is especially desirable when making relatively large waveguide devices that can be used in optical touch screen sensors as described in U.S. Pat. Nos. 5,914,709, 6,181,842 and 6,351,260 Large area rectangular substrates allow better packing efficiencies than smaller circular substrates, especially if the waveguide structures are L-shaped or elongated rectangles such as strips (so that two or four waveguide structures are used to encompass the perimeter of a rectangular display). Irrespective of substrate shape, it is advantageous to fabricate waveguide devices on large area substrates because of the higher throughput per substrate and shorter processing time per device Rectangular substrates are widely used in the flat panel display industry, with standard sizes starting from Generation 1 (2.70 mm×300 mm) and extending at present up to Generation 7 (1870 mm×2200 mm). These substrates are frequently glass (eg. BK7), but may also be polymer A large number of polymer substrate materials are available, with an extensive range including polycarbonate, polymethyl methacrylate, polyester, polyethylene, polyimide, polystyrene, nylon, polyvinyl chloride and polysulfone listed in U.S. Pat. No. 6,917,749 Because they are widely available with high surface quality and at relatively low cost, three particularly preferred polymer substrate materials are polycarbonates, polysulfones and the polyester polyethylene terephthalate (PET). If polymer substrates are to be used, solvent-free polymer materials have yet another advantage in that there need not be any concern about whether the substrate will be attacked by a solvent in the material. Although some polymer substrate materials such as polyimide, PEN and PET are known to have good solvent resistance, others such as polycarbonate acrylate and polystyrene do not.

Apart from producing layers with inferior thickness uniformity, a further disadvantage of many low wastage deposition methods, including extrusion coating, is that (compared to spin coating) they utilise a lesser portion of the available substrate area. As shown in FIG. 1, an extrusion coater will typically only deposit material 10 to within 5 mm of the edge of a substrate 11, and the edge bead 12 on the deposited material may extend in a further 2 mm. Clearly this is a less than optimal use of the available substrate area: if the substrate were a Generation 1 flat panel for example, the usable area of deposited material 10 would be 263 mm×293 mm (ie 77,059 mm$^2$), or 95.1% of the available substrate area. The problem is exacerbated if multiple layers have to be deposited, since each subsequent layer can only be deposited accurately on the usable area of the underlying layer. In the case of polymer optical waveguide fabrication for example, where a lower cladding layer is extrusion coated onto a Generation 1 substrate, followed by extrusion coating of a core layer, the usable (ie. patternable) area of the core layer will be 256 mm×286 mm (ie. 73,216 mm$^2$) or 90 4% of the available substrate area The result is fewer waveguide devices per substrate, with obvious implications for the output of a fabrication plant In contrast, as shown in FIG. 2, in spin coating material 10 is deposited right to the edge of a substrate 11, with an edge bead 12 that may only extend 1 mm in from the edge In this case, a lower cladding layer/core layer sequence on a Generation 1 substrate will utilise 268 mm×298 mm (ie 79,864 mm$^2$) or 98.6% of the available area.

A two-stage deposition process that combines a low material wastage process such as extrusion coating, followed by a spinning step, will therefore reduce the amount of material required (compared to spin coating alone), while maximising the utilisation of the substrate area It is this combined effect, together with the non-volatile polymer materials required for a two-step deposition process to successfully produce highly uniform layers, that is the core of the present invention.

Since a substantially non-volatile polymer remains in liquid form after deposition, it will generally need to be curable by some means such as heat or actinic radiation, preferably UV radiation. The curing preferably causes a solubility change that can be exploited with a developing solvent, to remove unexposed material The patterning of layers of material by UV lithography generally involves exposure to UV light through a mask This is the case whether the material itself is photo-patternable, as with UV curable or cross-linkable polymers for example, or if a photoresist layer is used to transfer the pattern to the material. Depending on the UV lithography tool, the mask may be far removed from the substrate (eg. in projection systems) or it may be in contact with or in close proximity to the substrate (eg contact or proximity printing mask aligner systems). For mask longevity, projection systems may be preferred Where the photo-patternable material is a substantially non-volatile polymer of pre-polymer, in general it is not possible to utilise contact printing since the material remains "tacky" before curing, and tends to adhere to the mask. Thus, it is appropriate to use proximity printing or projection aligner systems In both of these cases it is important that the distance between the mask and the substrate is substantially uniform over entire surface of the substrate to maximise the uniformity of the pattern resolution For example, a typical tolerance on focus is ±5 μm on a Canon MPA 500 projection system One way of achieving this when patterning large area substrates with an equally large area mask is to suspend both mask and substrate in a vertical or near-vertical configuration rather than a horizontal configuration, to avoid gravity-induced sagging of the mask and/or substrate. The requirement to hold the substrate substantially vertically is a potential problem for substantially non-volatile polymers and/or pre-polymers that remain liquid prior to UV exposure, and imposes limits on their viscosity If the viscosity is too low, the material will flow when the substrate is held vertically, resulting in variable layer thickness. On the other hand, if the viscosity is too high, the material is difficult to coat onto the substrate and the quality of the coated layer will be poor. Accordingly, a second aspect of this invention is the use of substantially non-volatile polymers and/or pre-polymers with viscosity in the appropriate range for deposition and patterning via UV photolithography on large area substrates, which can retain a substantially uniform thickness (<±2%) on a vertical or near-vertical surface for a sufficient time to allow UV curing.

As a particular case of a substantially non-volatile polymer system, a solvent-free polymer system is typically made up of low molecular weight polymer chains known as oligomers. If the molecular weight of these oligomers is too low, such that some oligomers lack sufficient numbers of polymerisable groups, then effective curing cannot take place. Molecular weight also affects the viscosity of a polymer, with viscosity generally increasing with molecular weight. The preferred viscosity range of interest is typically 100-10,000 cP, more preferably 500-5,000 cP and most preferably 1,000-4,000 cP. Viscosity often correlates strongly with temperature, so these preferred viscosities refer to the temperature (usually room temperature) at which the process steps are carried out.

Some non-limiting classes of solvent-free, radiation curable polymers or pre-polymers suitable for optical waveguide fabrication will now be considered One such class of materials is halogenated vinyl ethers, as disclosed in U.S. Pat. Nos. 6,291,704 and 6,308,001. Another class is halogenated multifunctional acrylate or epoxy compounds, as disclosed in U.S. Pat. Nos. 6,496,637 and 6,555,288 These materials, with a high degree of halogenation (typically fluorination) and concomitant low CH content, have been specifically designed for waveguide devices for the telecommunications market, where low optical loss at 1 55 μm is a priority. As such they are also expensive, and for waveguide devices at other operating wavelengths (eg. 0.6 to 1.0 μm) where CH-based optical absorption is not an issue, the conventional hydrocarbon analogues may be used A preferred class of solvent-free, radiation curable polymers or pre-polymers is siloxane polymers (ie. polymers with an alternating Si—O backbone), preferably synthesised by a condensation reaction as disclosed in U.S. Pat. Nos. 6,800,724, 6,818,721 or 6,965,006, the contents of which are incorporated herein by reference, and preferably containing ethylenically unsaturated substitutents The ethylenically unsaturated substitutents on radiation curable siloxane polymers may for example be methacrylate groups, styrene groups (as in U.S. Pat. No. 6,727,337, the contents of which are also incorporated herein by reference) or vinyl groups Alternatively, the polymers may contain some other group capable of undergoing polymerisation, such as epoxide groups.

In one preferred form, the polymer used in the present invention is a siloxane synthesised by a method disclosed in U.S. Pat. No. 6,800,724, involving the steps of: acidolysis of a metal alkoxide compound with an acid to produce an intermediate acidolysed solution; and condensation of the intermediate solution in the presence of a metal alkoxide compound to produce the metal alkoxide polymer.

Generally the metal alkoxide compounds used in the respective acidolysis and condensation steps are different, but they may be the same.

Preferably the acidolysis and condensation steps are performed without addition of water. Acid is consumed in the acidolysis reaction.

Preferably the metal alkoxide compounds are organically modified. More preferably at least 25% of the metal alkoxide compounds used in the acidolysis and/or condensation steps are organically modified An organically modified metal alkoxide compound is one that includes at least one metal to carbon bond that is unaffected during acidolysis and condensation steps Preferably the metal alkoxide compound(s) have the general formula $$R^1_n M(OR)_{V-n} \qquad (1)$$

where M is a metal of valence V, n is an integer from 0 to (V−1); R is a short chain alkyl group with 1 to 6 carbon atoms; and $R^1$ is an alkyl or aryl group containing from 1 to 20 carbon atoms. The alkyl or aryl group $R^1$ may have substitutents including species such as alkenyl, allyl, alkacryloxy, acryloxy or epoxy groups, which can be polymerised either photolytically or thermally to form an organic network, as well as halogen, amino, mercapto, cyano, nitro, amido and hydroxy groups If more than one $R^1$ group is present, the $R^1$ groups may or may not be identical. Preferably at least one of the metal alkoxide compounds should have n greater than zero, that is have at least one M-C bond, and said compounds should make up at least 25% of the total number of metal alkoxide species.

Preferably the metal alkoxide compound(s) are alkoxides of silicon, zirconium, titanium, germanium and/or aluminium.

Preferably the acid is an inorganic acid such as boric or phosphoric acid or a carboxylic acid such as formic, acetic or oxalic acid. More preferably the acid is of an element that has a glass forming or glass modifying oxide, and has a pKa greater than about 2. Preferably the molar ratio of the acid to the metal alkoxide compound in the acidolysis step is from 1.5 to 10:1.

Preferably the acidolysis of the metal alkoxide compound is performed in the presence of a mutual solvent, for example an alcohol such as methanol. Note that this mutual solvent is removed after the polymer has been synthesised; consequently the polymer is solvent-free and substantially non-volatile at the time of deposition.

In another preferred form of the present invention, the polymer is prepared by a process disclosed in U.S. Pat. No. 6,818,721, which comprises reacting together:

(A) at least one silicon containing compound having at least one silanol group; and (B) at least one silicon containing compound having at least one —OR group wherein R represents an alkyl group having from 1 to 8 carbon atoms, or an alkoxyalkyl group having from 2 to 8 carbon atoms in the presence of (C) a calcium or magnesium catalyst selected to allow the reaction to proceed and (D) at least one solvent The organosilicon condensate is a siloxane, and most preferably a polysiloxane Compounds (A) and (B) may independently be monomeric, dimeric, oligomeric or polymeric compounds The at least one silicon containing compound (A) is advantageously a silanol having between one and three unsubstituted or substituted hydrocarbon groups having from 1 to 18 carbon atoms, or alternatively may be described as a silanol with between one and four OH groups A silanol with four OH groups is, in its simplest form, silicic acid. Preferably, the silanol is diphenyl silanediol.

The silanol may also bear a crosslinkable group, for example, a double bond of the acrylate, methacrylate or styrene type Another suitable crosslinkable group is an epoxide group.

In one preferred embodiment, the at least one silicon containing compound having at least one —OR group (B) is a monomeric compound with the general formula:

$$G_y Si(OR)_{4-y} \tag{2}$$

wherein y has a value of 0, 1, 2 or 3, G represents a unsubstituted or substituted hydrocarbon group having from 1 to 18 carbon atoms; and R represents an alkyl group having from 1 to 8 carbon atoms or an alkoxyalkyl group having from 2 to 8 carbon atoms.

Preferably, the at least one silicon containing compound (B) is an alkoxysilane, which has from one to four alkoxy groups inclusive. Preferably, the alkoxy group (OR) is selected from the group consisting of methoxy, ethoxy, n-propoxy, i-propoxy, n-butoxy, i-butoxy and t-butoxy Like the silanol, the alkoxy silane may also bear a crosslinkable group, for example, a double bond of the acrylate, methacrylate or styrene type. Another suitable crosslinkable group is an epoxide group. Preferably, the crosslinkable group is on G, but it may be on OR.

Note that the solvent (D) is removed after the polymer has been synthesised; consequently the polymer is solvent-free and substantially non-volatile at the time of deposition.

In yet another preferred form of the present invention, as disclosed in U.S. Pat. No. 6,727,337, the siloxane is produced by condensation of one or more silanediols of formula (I) and/or derived precondensates thereof (I)

with one or more silanes of formula (II) and/or derived precondensates thereof.

(II)

wherein Ar¹ and Ar² are independently groups with 3 to 20 carbon atoms and at least one aromatic or heteroaromatic group and at least one of Ar¹ and Ar² bears a cross-linkable functional group; and $R^1$, $R^2$, $R^1$ and $R^4$ are independently alkyl, aralkyl or aryl with up to 20 carbon atoms. Preferably the ratio of formula (I) and formula (II) is 1:1.

Such a polycondensate has the structure (5)

wherein

Ar¹ and Ar² are independently groups with 3 to 20 carbon atoms and at least one aromatic or heteroaromatic group and at least one of Ar¹ and Ar² bears a cross-linkable group; $R^1$ and $R^2$ are independently alkyl, aralkyl or aryl with up to 20 carbon atoms; and q is at least 1 Ar¹ and Ar² may preferably have 5 to 20 carbon atoms The photo-curable materials further comprise at least one free radical generating photo-initiator. Examples of commercially available free radical generating photo-initiators suitable for UV light include 1-hydroxy-cyclohexyl-phenyl-ketone (Irgacure 184), 2-methyl-1[4-methylthio)phenyl]-2-morpholinopropan-1-one (Irgacure 907), 2,2-dimethoxy-1,2-diphenylethan-1-one (Irgacure 651), 2-benzyl-2-dimethylamino-1-(4-morpholinophenyl)-butanone-1 (Irgacure 369), 4-(dimethylamino)benzophenone, 2-hydroxy-2-methyl-1-phenyl-propan-1-one (Darocur 1173), benzophenone (Darocur BP), 1-[4-(2-hydroxyethoxy)-phenyl]-2-hydroxy-2-methyl-1-propane-1-one (Irgacure 2959), 4,4'-bis(diethylamino) benzophenone (DEAB), 2-chlorothioxanthone, 2-methylthioxanthone, 2-isopropylthioxanthone, benzoin and 4,4'-dimethoxybenzoin For curing with visible light, camphorquinone may be used as a photo-initiator. A mixture of two or more photo-initiators may also be used For example, Irgacure 1000 is a mixture of 80% Darocur 1173 and 20% Irgacure 184 For thermal curing, organic peroxides in the form of peroxides (eg dibenzoyl peroxide), peroxydicarbonates, peresters (t-butyl per benzoate), per ketals, hydroperoxides, as well as AIBN (azobisisobutyronitrile), may be used as initiators. The initiator may be present at a level from 0 01% to 10% by weight of the overall composition, more preferably from 0.5% to 4% by weight of the overall composition A liquid initiator is generally preferred, for ease of mixing into the curable material. However certain solid initiators may also be soluble in the curable material, without addition of a solvent Other additives, such as stabilisers, plasticizers, contrast enhancers, dyes or fillers may be added to enhance the properties of the photo-curable polymer as required. Volatility data for some standard siloxane polymers will now be presented, to demonstrate that siloxane polymers synthesised by the reactions disclosed in U.S. Pat. Nos. 6,800,724, 6,818,721 and 6,965,006 are highly likely to satisfy the "substantially non-volatile" criteria described above in relation to Table 1. The most commonly available siloxane polymers, for which volatility data are available in the literature, are linear methyl-substituted siloxanes, ie with each silicon atom bearing two or three methyl groups. Table 2 presents volatility data for linear methyl-substituted siloxanes with up to eleven silicon atoms (note that "Me" signifies a methyl group, $CH_3$—)

TABLE 2

| Siloxane type | Structure | Molecular weight | Boiling point at 1 atm pressure (° C.) | Temperature at which vapour pressure is 1 mmHg (° C.) | Vapour Pressure at 20° C. (mmHg) |
|---|---|---|---|---|---|
| Tetrasiloxane | Me—(Si(Me$_2$)O)$_3$—SiMe$_3$ | 310.7 | 193.5 | 35.3 | 0.45 |
| Pentasiloxane | Me—(Si(Me$_2$)O)$_4$—SiMe$_3$ | 384.9 | 220.5 | 56.6 | 0.0525 |
| Hexasiloxane | Me—(Si(Me$_2$)O)$_5$—SiMe$_3$ | 459.0 | 245.5 | 73.7 | 0.0075 |
| Octasiloxane | Me—(Si(Me$_2$)O)$_7$—SiMe$_3$ | 607.3 | 290.0 | 105.8 | 0.0003 |
| Nonasiloxane | Me—(Si(Me$_2$)O)$_8$—SiMe$_3$ | 681.5 | 307.5 | 144.0 | not available |
| Decasiloxane | Me—(Si(Me$_2$)O)$_9$—SiMe$_3$ | 755.7 | 314.0 | 160.3 | not available |
| Hendeca-siloxane | Me—(Si(Me$_2$)O)$_{10}$—SiMe$_3$ | 829.8 | 322.8 | 175.2 | not available |

Inspection of the boiling point data in Table 2 shows that methyl-substituted siloxanes of even modest chain length, that would generally be regarded as oligomers rather than polymers, have boiling points in excess of 175° C. For the purposes of the present invention, and in contrast to the solvents listed in Table 1 above, these methyl-substituted siloxanes would be regarded as substantially non-volatile. Equally, they would be regarded as substantially non-volatile because they have a vapour pressure of 1 mmHg at temperatures that exceed 20° C. They would also be regarded as substantially non-volatile because they have a vapour pressure of below 0.5 mmHg at 20° C. Indeed once the number of repeat units reaches 5, with a molecular weight of 384 9, the vapour pressure is below 0 1 mmHg. It will be appreciated by those skilled in the art that siloxane based polymers or oligomers with higher molecular weights will have lower vapour pressures. Since siloxane polymers synthesised by routes disclosed in U.S. Pat. Nos. 6,800,724, 6,818,721 or 6,965,006 invariably have molecular weights in excess of 500, and typically above 1000, it is clear that, as defined in this specification, they will be substantially non-volatile.

Finally, we refer to several instances in the patent literature where siloxane polymers (also known as silicones) are regarded as being non-volatile: U.S. Pat. No. 3,935,133, US 2001/0031269, U.S. Pat. No. 6,685,921 and US 2004/0209784

The following example describes the deposition of a layer of a photo-curable siloxane polymer via a two-stage extrude-and-spin process, followed by a blanket curing step.

EXAMPLE 1

Following the procedure disclosed in U.S. Pat. No. 6,818,721, a UV-curable siloxane polymer A was prepared with a viscosity of 2500 cP (at 20° C.) and a refractive index (measured at 20° C. on an Abbé refractometer with room light) of 1 483. A suitable photo-initiator was dissolved directly into polymer A, without addition of any solvent. Polymer A was extruded onto a 400 mm×500 mm×175 μm polycarbonate sheet using a FAStar Advantage III Extrusion Coating System to form a layer 25 μm thick, then transferred to a spinner where it was further planarised (and thinned) to improve the thickness uniformity by spinning at 1500 rpm for 15 seconds. The planarised layer was cured with UV light from a mercury lamp in a Tamarack PRX8000 flood illuminator to form a layer 20 μm thick with a refractive index of 1478 (at 20° C. and 1550 nm) and a relative thickness uniformity of <0 5% (±0.1 μm absolute uniformity).

COMPARATIVE EXAMPLE 1

Under conditions as identical as possible to Example 1, polymer A was extruded onto a 400 mm×500 mm×175 μm polycarbonate sheet using a FAStar Advantage III Extrusion Coating System to form a layer 25 μm thick Without spinning, the layer was cured with UV light from a mercury lamp in a Tamarack PRX8000 flood illuminator to form a layer 22.5 μm thick with a refractive index of 1.478 (at 20° C. and 1550 nm) and a relative thickness uniformity of about 3% (±0 6 μm absolute uniformity). It will be appreciated that the quality of this layer is inferior to that of the layer produced in Example 1

Figure 3:
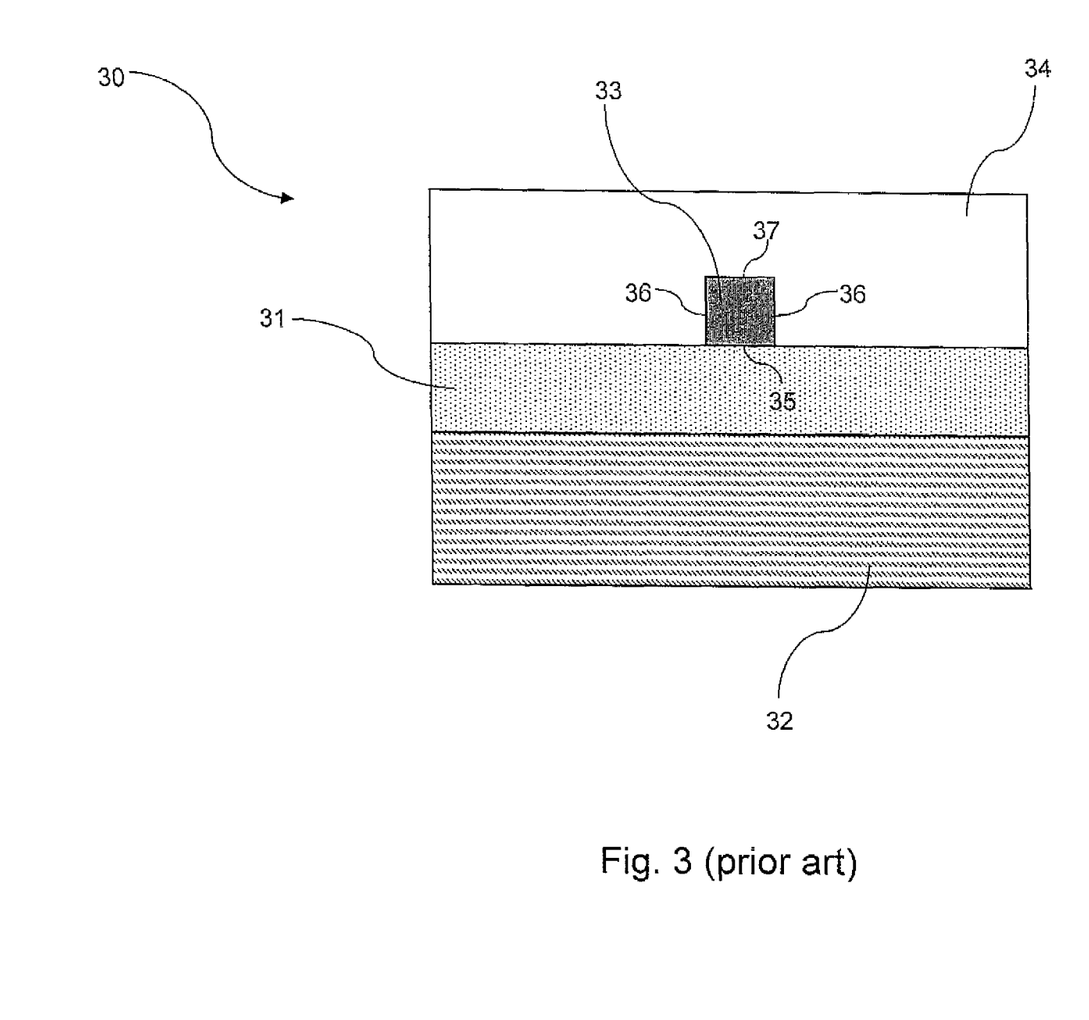
FIG. 3 shows an end view of a typical prior art integrated optical waveguide.

Integrated optical waveguides frequently have a multilayer structure; as shown schematically in FIG. 3 an integrated optical waveguide 30 may comprise a lower cladding layer 31 supported on a substrate 32, a patterned core 33 and an upper cladding layer 34 It will be appreciated that to minimise scattering loss of light propagating along the core 33, it is important for the boundaries of the core to be as smooth as possible In the particular waveguide shown in FIG. 3, where the core 33 is approximately square in cross section, the smoothness of the lower boundary 35 is determined largely by the quality or uniformity of the lower cladding layer 31, ie. by the process used to deposit it. On the other hand, the smoothness of the side boundaries 36 and upper boundary 37 depends on a combination of the core deposition and patterning processes For example if the core 33 is produced by depositing and selectively curing a layer of a cut able core material, say in a UV photolithography/wet etching process, the smoothness of the side boundaries 36 will be determined largely by the selective curing process, while the smoothness of the upper boundary 37 will be determined largely by the process used to deposit the core layer. Alternatively, if the core 33 is produced by a moulding or embossing process, as disclosed in U.S. Pat. Nos. 5,230,990 and 5,265,184 for example, the smoothness of the side boundaries 36 and the upper boundary 37 will be determined by the smoothness of the mould and the release efficiency. In another alternative, if the core 33 is produced by a direct dispense and cure process, as disclosed in U.S. Pat. No. 5,534,101 for example, the smoothness of the side boundaries 36 and the upper boundary 37 will be determined largely by the rheology of the uncured core material Finally, it will be noted that the uniformity of the upper cladding layer 34 will have relatively little influence on the scattering loss of light propagating along the core 33.

Irrespective of the process used to deposit and pattern a core layer, it will be appreciated that when fabricating integrated optical waveguides using curable materials, it is generally important for at least the lower cladding layer, and possibly the core layer, to be as uniform as possible The following two examples describe the fabrication of an integrated optical waveguide from photo-curable siloxane polymers, where at least one of the optical layers is deposited via a two-stage extrude-and-spin process that produces a highly uniform layer (similar to spin coating alone) with low wastage of material (similar to extrusion coating alone).

EXAMPLE 2

This example illustrates a waveguide fabrication process where the cote layer is patterned by a UV lithography/wet etch process As in Example 1, a UV-curable siloxane polymer A was prepared with a viscosity of 2500 cP (at 20° C.) and a refractive index (measured at 20° C. on an Abbé refractometer with room light) of 1.483. A higher refractive index UV-curable siloxane polymer B was also prepared, with a viscosity of 2200 cP (at 20° C.) and a refractive index of 1.509 (at 20° C.).

A suitable photo-initiator was dissolved directly into both polymer A and polymer B, without addition of any solvent. Polymer A was extruded onto a 400 mm×500 mm×175 µm polycarbonate sheet using a FAStar Advantage III Extrusion Coating System to form a layer 25 µm thick, then transferred to a spinner where it was further planarised (and thinned) to improve the thickness uniformity by spinning at 1500 rpm for 15 seconds. The planarised layer was cured with UV light from a mercury lamp in a Tamarack PRX8000 flood illuminator to form a lower cladding layer 20 µm thick with a refractive index of 1.478 (at 20° C. and 1550 nm) and a relative thickness uniformity of <0.5% (±0 1 µm absolute uniformity) Polymer B was deposited onto the lower cladding layer by an identical extrude and spin process to form a core layer 11 µm thick, and imagewise exposed to UV light through a mask in a Tamarack model 303 photolithography tool. Unexposed polymer B material was then dissolved in isopropanol to leave exposed material in the form of an elongated channel waveguide. Exposed polymer B material had a refractive index of 1 505 (at 20° C. and 1550 nm). An upper cladding layer of polymer A was then deposited by extrusion coating and cured in a similar manner to the lower cladding layer Alternatively, the upper cladding layer could be deposited by a two-stage extrude-and-spin process

EXAMPLE 3

This example illustrates a waveguide fabrication process where the core layer is patterned by a moulding process. To produce the mould, a layer of photoresist was spin coated onto a 400 mm×500 mm glass sheet and imagewise exposed to UV light (through the same mask used to pattern the polymer B layer in Example 2) in a Tamarack 303 photolithography tool. Unexposed photoresist was dissolved in isopropanol to produce a master with the desired waveguide pattern. Polydimethylsiloxane (PDMS) was cast onto the master, cured and peeled off to form the mould PDMS is a preferred material for producing the mould, because it has low surface energy (ie it does not stick to most materials) and is transparent to UV light Lower refractive index polymer A and higher refractive index polymer B were prepared as in Examples 1 and 2 Polymer A was extruded onto a 400 mm×500 mm×175 µm polycarbonate sheet using a FAStar Advantage III Extrusion Coating System to form a layer 25 µm thick, then transferred to a spinner where it was further planarised (and thinned) by spinning at 1500 rpm for 15 seconds The planarised film was cured with UV light from a mercury lamp in a Tamarack PRX8000 flood illuminator to form a lower cladding layer 20 µm thick. Polymer B was deposited onto the lower cladding layer by extrusion coating to form a core layer 11 µm thick. The PDMS mould was then applied to the polymer B layer, the polymer cured with UV light in the Tamarack PRX8000 flood illuminator, and the PDMS mould peeled off for future use. An upper cladding layer of polymer A was deposited by extrusion coating and cured in a similar manner to the lower cladding layer. Alternatively, the core layer or upper cladding layer could be deposited by a two-stage extrude-and-spin process.

The invention has been described by reference to certain preferred embodiments; however it should be understood that it may be embodied in other specific forms or variations thereof without departing from its spirit or essential characteristics The embodiments described above are therefore considered to be illustrative in all respects and not restrictive, the scope of the invention being defined by the appended claims rather than by the foregoing description.

What we claim is:

1. A method of coating a substrate with a layer of solvent-free coating material of substantially uniform thickness, said method comprising:
   applying a liquid film of a first uniform thickness of said coating material to said substrate by a process selected from extrusion coating, slot coating, roller coating, meniscus coating, curtain coating, spray coating and doctor blading, said coating material being substantially non-volatile;
   transferring said substrate from an application station to a spinning station; and
   spinning said substrate to provide a layer of a second uniform thickness, wherein said second uniform thickness is of greater uniformity than said first uniform thickness.

2. A method according to claim 1 wherein applying a liquid film of said coating material to said substrate is by extrusion coating.

3. A method according to claim 1 wherein said layer has thickness uniformity better than 4%, preferably better than 2%, and most preferably better than 0.5%.

4. A method according to claim 1 wherein the coating material is a siloxane polymer.

5. A method according to claim 1 wherein the coating material has a viscosity in the range 100-10,000 cP, preferably in the range 500-5,000 cP, and most preferably in the range 1,000-4,000 cP.

6. A method according to claim 1 wherein the coating material is curable by actinic radiation.

7. A method according to claim 6 wherein the actinic radiation is UV radiation.

8. A method according to claim 1 wherein the substrate coated with a layer of coating material of substantially uniform thickness is used in the fabrication of an optical waveguide.

9. A method according to claim 8 wherein the optical waveguide forms a component of an optical backplane, a telecommunications system, a data communications system, or a waveguide-based optical touch screen sensor.

10. A method according to claim 1 wherein the substrate is a circular wafer or rectangular panel.

11. A method according to claim 10 wherein the rectangular panel is at least 200 mm×200 mm in size, and preferably at least 270 mm×300 mm in size.

12. A method according to claim 11 wherein the rectangular panel is composed of a glass, a polymer or a laminate.

13. A method of coating a substrate with a cured layer of solvent-free coating material of substantially uniform thickness, said method comprising:
   applying a liquid film of a first uniform thickness of said coating material to said substrate by a process selected from extrusion coating, slot coating, roller coating, meniscus coating, curtain coating, spray coating and doctor blading, said coating material being substantially non-volatile;

transferring said substrate from an application station to a spinning station;

spinning said substrate to provide a layer of a second uniform thickness, wherein said second uniform thickness is of greater uniformity than said first uniform thickness; and curing said coating material to provide a cured layer of substantially uniform thickness.

14. A method according to claim 13 wherein applying a liquid film of said coating material to said substrate is by extrusion coating.

15. A method according to claim 13 wherein said layer has thickness uniformity better than 4%, preferably better than 2%, and most preferably better than 0.5%.

16. A method according to claim 13 wherein curing occurs for a predetermined portion of the coating material, providing a defined region of coating material that is uncured and a defined region of cured coating material.

17. A method according to claim 16 wherein curing causes the cured coating material to have a solubility different from the solubility of the coating material that is uncured.

18. A method according to claim 17 wherein curing causes the cured coating material to be less soluble in a developing solvent than the coating material that is uncured.

19. A method according to claim 18 further comprising the step of removing coating material that is uncured.

20. A method according to claim 19 wherein coating material that is uncured is removed by exposure to a developing solvent.

21. A method according to claim 13 wherein the coating material is a polymer, pre-polymer, or mixture of oligomers and monomers.

22. A method according to claim 13 wherein the coating material has a viscosity in the range 100-10,000 cP, preferably in the range 500-5,000 cP, and most preferably in the range 1,000-4,000 cP.

23. A method according to claim 13 wherein the coating material is cured by actinic radiation.

24. A method according to claim 23 wherein the actinic radiation is UV radiation.

25. A method according to claim 13 wherein the substrate coated with a cured layer of coating material of substantially uniform thickness is used in the fabrication of an optical waveguide.

26. A method according to claim 25 wherein the optical waveguide forms a component of an optical backplane, a telecommunications system, a data communications system, or a waveguide-based optical touch screen sensor.

27. A method according to claim 13 wherein the substrate is a circular wafer or rectangular panel.

28. A method according to claim 27 wherein the rectangular panel is at least 200 mm×200 mm in size, and more preferably at least 270 mm×300 mm in size.

29. A method according to claim 27 wherein the rectangular panel is composed of a glass, a polymer or a laminate.

* * * * *